United States Patent [19]

Nakatsugawa et al.

[11] Patent Number: 4,878,194

[45] Date of Patent: Oct. 31, 1989

[54] DIGITAL SIGNAL PROCESSING APPARATUS

[75] Inventors: Kenji Nakatsugawa, Aiko; Aiichi Katayama, Isehara; Hitoshi Sekiya, Atsugi, all of Japan

[73] Assignee: Anritsu Corporation, Tokyo, Japan

[21] Appl. No.: 168,627

[22] Filed: Mar. 7, 1988

Related U.S. Application Data

[63] Continuation of Ser. No. 786,222, Oct. 9, 1985, abandoned.

[30] Foreign Application Priority Data

Oct. 15, 1984 [JP] Japan .......... 59-215862

[51] Int. Cl.[4] .......... G06F 3/14; H01J 29/70; G09G 1/00

[52] U.S. Cl. .......... 364/900; 364/718; 364/487; 340/722

[58] Field of Search ... 364/200 MS File, 900 MS File, 364/718, 487; 84/1.19, 1.13; 324/121 R

[56] References Cited

U.S. PATENT DOCUMENTS

| | | | |
|---|---|---|---|
| 3,504,164 | 4/1964 | Farrell et al. | 364/417 |
| 4,072,851 | 2/1978 | Rose | 364/487 |
| 4,093,995 | 6/1978 | Smith et al. | 364/900 |
| 4,134,149 | 1/1979 | Nord | 364/900 |
| 4,198,683 | 4/1980 | Dagostino | 364/900 |
| 4,223,582 | 9/1980 | Kato et al. | 84/1.19 |
| 4,244,259 | 11/1981 | Koike | 84/1.19 |
| 4,254,779 | 3/1981 | Miyata et al. | 364/417 |
| 4,257,043 | 3/1981 | Tsuchiko | 324/121 R |
| 4,275,446 | 6/1981 | Blaess | 364/487 |
| 4,338,674 | 7/1982 | Hamada | 364/718 |
| 4,386,614 | 6/1983 | Ryan | 340/722 |
| 4,399,512 | 8/1983 | Soma et al. | 364/487 |
| 4,455,613 | 6/1984 | Shoemaker | 364/487 |
| 4,464,656 | 8/1984 | Nakamura | 340/722 |
| 4,482,861 | 11/1984 | Jalovec et al. | 324/121 R |
| 4,510,571 | 4/1985 | Dagostino et al. | 364/487 |
| 4,525,667 | 6/1985 | Sawano et al. | 364/487 |
| 4,536,853 | 8/1985 | Kawamoto et al. | 364/718 |
| 4,562,763 | 1/1986 | Kaneko | 84/1.19 |
| 4,566,364 | 1/1986 | Katoh | 84/1.19 |
| 4,616,175 | 10/1986 | Hanmura | 324/121 R |
| 4,633,719 | 1/1987 | Vander Heyden | 73/861.28 |
| 4,641,564 | 2/1987 | Okamoto | 84/1.19 |
| 4,642,519 | 2/1987 | Nakatsugawa et al. | 364/487 |
| 4,647,862 | 3/1987 | Blair | 364/487 |
| 4,691,608 | 9/1987 | Sasaki et al. | 84/1.13 |
| 4,697,138 | 9/1987 | Morishita et al. | 324/121 R |

*Primary Examiner*—Gareth D. Shaw
*Assistant Examiner*—Viet Nguyen
*Attorney, Agent, or Firm*—Frishauf, Holtz, Goodman & Woodward

[57] ABSTRACT

A digital signal processing apparatus includes an A/D converter for converting an analog input signal to digital data, a memory having a plurality of memory blocks for storing the digital data, and a processor for processing digital data when read out from the memory. A first controller cyclically stores output digital data from the A/D converter in the blocks in the memory in a predetermined order and outputs the stored data to the processor every time a first command is generated by a first command generator. A second controller inhibits updating of a specific block designated by a second command generator, and outputs the data from the specific block to the processor every time a second command is generated by the second command generator.

4 Claims, 2 Drawing Sheets

DIGITAL SIGNAL PROCESSING APPARATUS

This application is a continuation of application Ser. No. 786,222, filed Oct. 9, 1985, abandoned.

BACKGROUND OF THE INVENTION

The present invention relates to a digital signal processing apparatus and, more particularly, to a digital signal processing apparatus having a memory for wave data consisting of a plurality of blocks wherein the blocks in the wave memory are automatically and incrementally addressed to sequentially receive waveform data of an input signal upon each measurement in a first mode, and in the second mode desired specific wave data is read out from a nonupdated block which has received the data in the first mode, thereby performing signal processing.

Conventional digital signal processing apparatuses are shown in FIGS. 1 and 2, respectively. According to these apparatuses, measurement of an analog signal wave is converted to a digital signal, and the digital signal is stored in a memory. The stored data is read out and processed for waveform analysis. The analyzed results are displayed on a display.

Referring to FIG. 1, a memory 12 for wave data comprises a plurality of blocks 12-1 to 12-N. Signal wave data digitized by an A/D converter 11 is stored in one of the blocks 12-1 to 12-N. Selection of the block in the memory 12 for storing the digital wave data is independently designated by an external block designating device 13. The wave data stored in the blocks 12-1 to 12-N of the memory 12 are selectively read out and fetched by a microprocessor 14. The readout data is processed as needed. Processed results are displayed on a display 15.

In another conventional digital signal processing apparatus shown in FIG. 2, a memory 12 for wave data comprises a signal block. N displaying screen memories 16 are arranged to display data processed by a microprocessor 14.

However, these conventional apparatuses have the following drawbacks. In the arrangement shown in FIG. 1, since the block in the memory 12 is independently designated, a single block may be repeatedly designated to update important signal wave data to new wave data, resulting in the undesirable loss of the prior data. In the arrangement of FIG. 2, since the memory 12 consists of a single block, once the stored data is updated with new input wave data, wave analysis and signal processing using the previous wave data cannot be performed.

SUMMARY OF THE INVENTION

It is an object of the present invention to solve the conventional drawbacks described above and to provide a digital signal processing apparatus wherein blocks in a memory for wave data having a plurality of blocks for storing input wave data are automatically and incrementally addressed to update the stored data in chronological order from the oldest data to the newest data, and desired wave data can be selectively read out from the blocks.

In order to achieve the above object of the present invention, there is provided a digital signal processing apparatus having an A/D converter for converting an analog input signal to digital data, a memory consisting of a plurality of blocks for storing the digital data, and a processor for processing the digital data read out from the memory, comprising: a first command generator, a second command generator, a first controller for cyclically storing the digital data in the blocks in the memory in a predetermined order and for outputting the stored data to the processor every time a first command is generated by the first command generator; and a second controller for inhibiting updating of a specific block designated by a second command and for outputting the data from the specific block to the processor every time the second command is generated by the second command generator.

DETAILED DESCRIPTION OF THE PREFERRED EMBODIMENT

Figure 1:
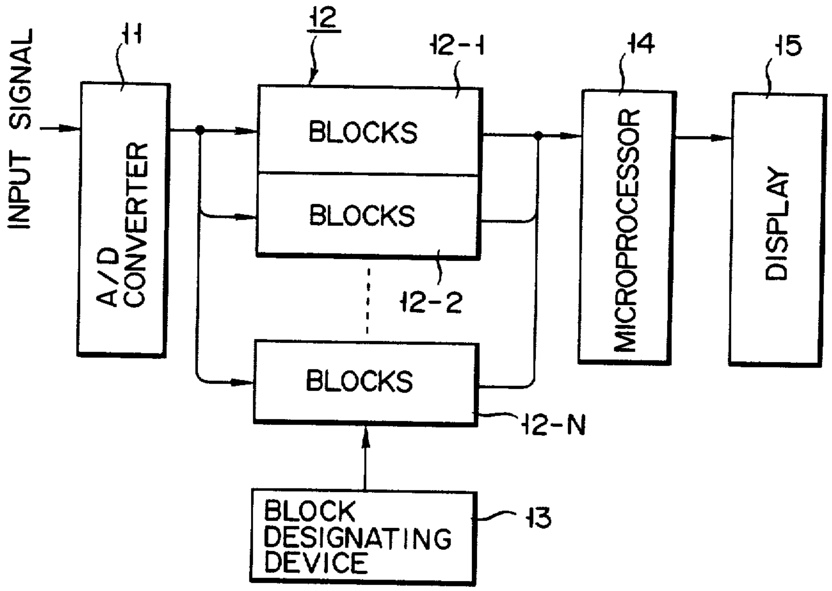
FIG. 1 (PRIOR ART)
FIGS. 1 and 2 are block diagrams of conventional digital signal processing apparatuses, respectively.
Figure 2:
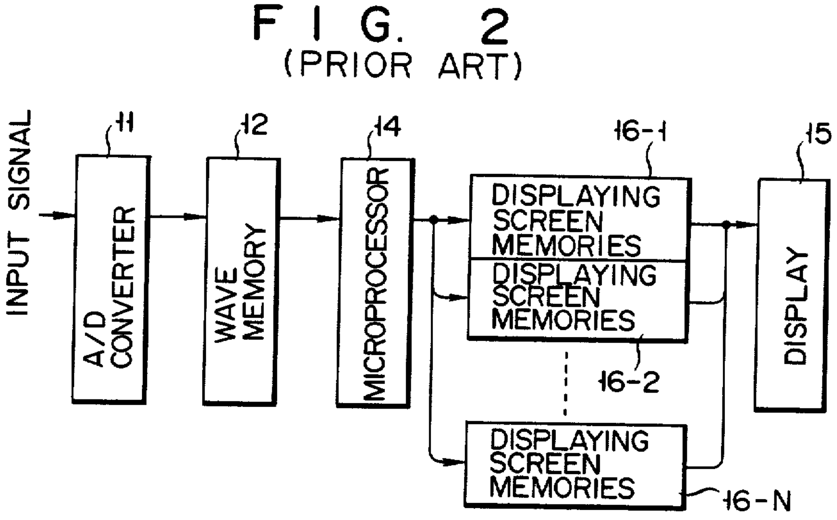
FIG. 2 (PRIOR ART)
Figure 3:
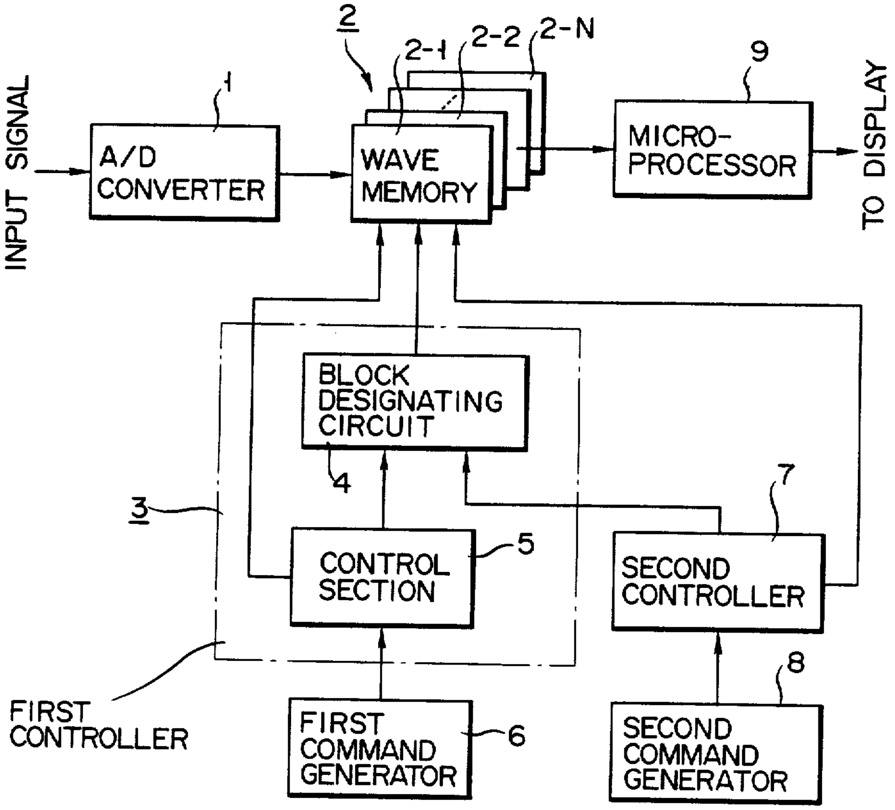
FIG. 3 is a block diagram of a digital signal processing apparatus according to an embodiment of the present invention.

FIG. 3 is a block diagram of a digital signal processing apparatus according to an embodiment of the present invention.

Referring to FIG. 3, reference numeral 1 denotes an A/D converter; 2, a memory for wave data; 3, a first controller; 4, a block designating circuit: 5, a control section; 6, a first command generator; 7, a second controller; 8, a second command generator; and 9, a microprocessor.

The A/D converter 1 converts an input analog signal to digital data. The digital data converted by the converter 1 is stored in a specific block in the memory 2 in response to a control signal from the controller 3. The memory 2 is defined as a memory for storing wave data representing a voltage signal or the like derived from the analog input signal wave. The memory 2 consists of N blocks 2-1 to 2-N. The controller 3 generates control signals for accessing the specific block in the memory 2 so as to store the digital wave data therein and for reading out the storage data therefrom. According to the control mode of the controller 3, the digital wave data obtained by A/D converting a measurement input signal supplied to the converter 1 is stored in the specific block in the memory 2, and the digital wave data is read out from the specific block and is transferred to the microprocessor 9. The circuit 4 receives control signals from the section 5 in the controller 3 and from the controller 7, and accesses one of the blocks in the memory 2. The section 5 receives a command signal from the generator 6 and generates a control signal for cyclically accessing the blocks in the memory 2 in a predetermined order. The section 5 supplies a read/write control signal to access the block designated by the circuit 4. The generator 6 serves as an external switch. Every time the switch is operated, i.e., every time the first command is generated by the generator 6, the block address to be updated is incremented by one. The controller 7 receives a second command from the generator 8 and generates a control signal for accessing the specific block in the memory 2 in accordance with the contents of the second command. Furthermore, the controller 7 inhibits the write access of the memory 2 and generates a read-only control signal. According to the control mode of the controller 7, the block of the memory 2 which is accessed by the generator 8 is selected, the wave data is read out from the accessed block, and the readout is transferred to the microprocessor 9. The second command generator 8 is comprised of a numeric-key pad. A block of the memory 2 which corresponds to the key switch data entered at the numeric-key pad is accessed. The microprocessor 9 receives the wave data read out from the block designated by the first or second controller 3 or 7 and performs signal processing (e.g., conversion from time-base data to frequency-axis data by FFT (Fast Fourier Transform)) or other wave analysis.

The operation of the apparatus in FIG. 3 will be briefly described hereinafter. Every time the first command is generated by the generator 6, the circuit 4 updates the address of the block in the memory 2 one by one. In this case, the block designated by the circuit 4 stores the digital wave data from the converter 1 and henceforth the digital wave data are sequentially stored in the blocks 2-1 to 2-N. The digital wave data is read out from the designated block and is processed by the microprocessor 9. The processed results are displayed on a display. When the Nth first command is generated by the generator 6, the digital wave data is stored in the block 2-N. Subsequently, when the (N+1)th first command is generated by the generator 6, the data in the block 2-1 is updated with the new digital wave data. Therefore, the blocks 2-1 to 2-N in the memory 2 cyclically store the new digital wave data in a predetermined cyclic order. Assume that n measurements are performed and that the measured input signal waves are stored in the memory 2. The digital wave data representing the nth to (n-N+1)th measurements are stored in the blocks 2-1 to 2-N in the memory 2, respectively. When the generator 8 generates a second command at this point, further updating of the memory 2 is inhibited. A specific block in the memory 2 is accessed in accordance with the content of the second command, and the digital wave data is read out from the specific block. The readout data is transferred to the microprocessor 9 and is processed in accordance with a predetermined algorithm, as described above.

Upon generation of the second command, the previous digital wave data stored in the memory 2 can be easily monitored and at the same time can be processed for subsequent analysis. The processed data can be easily displayed on a display.

According to the present invention as described above, the digital wave data can be automatically stored in the memory in the predetermined cyclic order, so that the latest data will not be erroneously updated. Furthermore, the input signal wave data can be observed while it is being stored. Since N latest digital wave data can be always stored, the previous measurement wave can be easily observed. The current wave can be compared with the previous wave for wave analysis and signal processing on the basis of the digital wave data stored in the memory.

The present invention is not limited to the particular embodiment described above. Various changes and modifications may be made within the spirit and scope of the invention. For example, the present invention can also be applied to various types of equipment such as digital storage oscilloscopes, waveform recorders, FFT analyzers and waveform analyzers, all adapting the digital signal processing techniques.

What is claimed is:

1. A digital signal processing apparatus, comprising:

analog-to-digital (A/D) converting means for converting an input analog signal to a corresponding output digital signal;

wave memory means having n memory blocks and coupled to said A/D converting means, for storing the output digital signal in designated ones of said n memory blocks, wherein each block of said n memory blocks stores information corresponding to a waveform of the input analog signal at a give time;

block designating means coupled to said wave memory means for supplying, in a first control mode, an incremented-block-designating signal for accessing each of said n memory blocks in a determined cyclical order, and for supplying, in a second control mode, a randomly selectable, specific-block-designating signal for accessing a selected one of said n memory blocks;

first control means coupled to said wave memory means, and including said block designating means, for outputting a first control signal to said wave memory means for enabling storing and reading operations for each memory block accessed by said block designating means in said first control mode and in response to a block incremental command, wherein the output digital signal of said A/D converting means is stored into, and read out from, each block of said n memory blocks in said determined cyclical order, each of the n memory blocks being updated after it undergoes a storing operation followed by a read-out operation, and wherein that memory block, in which an oldest output digital signal is stored, is updated to store, and subsequently read out, a newest output digital signal of the A/D converting means by operation of said first control means;

first command generating means coupled to said first control means for generating said block incremental command to access each of said n memory blocks in said cyclical order and to enable storage of the output digital signal from said A/D converting means incrementally in the n memory blocks of said wave memory means, and also to enable incrementally reading out signals stored in the n memory blocks of said wave memory means;

second control means, coupled to said wave memory means and said block designating means, for inhibiting the cyclical storing and reading operations of signals into and from, respectively, said n memory blocks, and for designating a specific block in said second control mode for enabling a reading-out operation from only the specific block so designated in response to a read-out command, said inhibition of the cyclical storing and reading operations, and the read only operation for said specific block in said second control mode, being such that signals ranging from an oldest output digital signal to a newest output digital signal as stored in said n memory blocks can be randomly selected as desired; and second command generating means coupled to the second control means for generating said read-out command to select said designated memory block and only read out the signal stored in the designated memory block of said n memory blocks.

2. The digital signal processing apparatus according to claim 1, wherein said incremental command generating means is a key switch.

3. The digital signal processing apparatus according to claim 1, wherein said read-out block command generating means is a ten-key switch pad.

4. An apparatus according to claim 1, wherein said apparatus further comprises a microprocessor means for performing a desired processing on signals read out from said wave memory means.

* * * * *

UNITED STATES PATENT AND TRADEMARK OFFICE
CERTIFICATE OF CORRECTION

PATENT NO. : 4,878,194

DATED : October 31, 1989

INVENTOR(S) : NAKATSUGAWA et al

It is certified that error appears in the above-identified patent and that said Letters Patent is hereby corrected as shown below:

In the title page, after U.S. Patent Documents, add and insert the following reference:

--0066866 4/1983 Japan 324/121R--.

Signed and Sealed this

Twenty-eighth Day of April, 1992

*Attest:*

HARRY F. MANBECK, JR.

*Attesting Officer*

*Commissioner of Patents and Trademarks*